(12) United States Patent
Dratwinski et al.

(10) Patent No.: US 7,319,531 B2
(45) Date of Patent: Jan. 15, 2008

(54) METHOD FOR MEASURING A THICKNESS OF A COATING

(75) Inventors: Marian Dratwinski, Stein (CH); Hermann Emminger, Aarau (CH); Hanspeter Lang, Hausen (CH); Klaus-Dieter Wassmer, Goerwihl (DE)

(73) Assignee: ALSTROM Technology Ltd., Baden (CH)

( * ) Notice: Subject to any disclaimer, the term of this patent is extended or adjusted under 35 U.S.C. 154(b) by 0 days.

(21) Appl. No.: 11/227,154

(22) Filed: Sep. 16, 2005

(65) Prior Publication Data

US 2007/0279645 A1    Dec. 6, 2007

(30) Foreign Application Priority Data

Sep. 30, 2004  (CH) ................................ 1595/04

(51) Int. Cl.
*G01B 9/02* (2006.01)
(52) U.S. Cl. ............ 356/630; 356/369; 356/511; 356/496; 374/45; 374/57
(58) Field of Classification Search ........... 356/630; 374/7, 45, 57
See application file for complete search history.

(56) References Cited

U.S. PATENT DOCUMENTS 4,745,291 A * 5/1988 Niiya .................... 250/559.28
5,258,824 A * 11/1993 Carlson et al. ............ 356/632
5,311,286 A   5/1994 Pike ............................ 356/371
6,301,009 B1 * 10/2001 Tinker ........................ 356/511
2002/0031164 A1 * 3/2002 Scheidt et al. ................. 374/7

FOREIGN PATENT DOCUMENTS

EP    0 121 617    10/1984

OTHER PUBLICATIONS

Sheard, S.J., and M.G. Somekh, Measurement of opaque coating thickness using photothermal radiometry, Applied Physics Letters 53 (26), Dec. 1988.*

* cited by examiner

*Primary Examiner*—Layla G. Lauchman
*Assistant Examiner*—Rebecca C. Slomski
(74) *Attorney, Agent, or Firm*—Cermak Kenealy & Vaidya LLP; Adam J. Cermak

(57) ABSTRACT

A method for measuring a thickness of a coating of a constructional unit, in particular a heat-compatible coating on a component of a gas turbine, includes measuring coordinates of the constructional unit three-dimensionally with a measuring device, in particular an optical scanner, before and after the coating, a thermal distortion of the constructional unit being recorded during the coating and the thickness of the coating being determined from a comparison of the measured constructional unit coordinates before and after the coating. The thermal distortion of the constructional unit is taken into account in the thickness determination of the coating by a comparison with at least one reference point at an uncoated location.

11 Claims, No Drawings

METHOD FOR MEASURING A THICKNESS OF A COATING

This application claims priority under 35 U.S.C. § 119 to Swiss application number 01595/04, filed 30 Sep. 2004, the entirety of which is incorporated by reference herein.

BACKGROUND OF THE INVENTION

1. Field of the Invention

The invention relates to a method for measuring a thickness of a coating of a constructional unit, in particular a heat-compatible coating on a component of a gas turbine.

2. Brief Description of the Related Art

Fluid-flow machines, in particular gas turbines, are often exposed to high temperatures during operation and are therefore provided with heat-compatible, often ceramic, coatings. These coatings are applied, for example by plasma-arc spray guns, to the metallic components in a number of layers, in that for each layer a number of strips of the layer material are sprayed onto the surface next to one another or else overlapping, until the surface is covered. The layer thickness can be measured during development of the process, for example by micrographs.

Variations during the coating process in production cannot be detected by capacitive measuring methods for metallic coatings and only to a restricted extent for ceramic coatings.

Apart from an exact determination of the layer thickness, for offline programming of the spraying device in particular, it is necessary to know an exact contour and mass-intensity distribution of the plasma/layer-material jet emitted by the spraying device. Without exact knowledge of them, the offline programming is inaccurate and the layer thicknesses, particularly at critical locations such as corners and radii, must be verified in a number of iterations by complex and cost-intensive micrographs.

SUMMARY OF THE INVENTION

The invention is intended to remedy this. One aspect of the present invention is concerned with the problem of providing an improved measuring method for determining a layer thickness and in particular for determining a mass-intensity distribution of a spraying device, whereby in particular the quality of the coating produced can be improved.

Still other aspects, features, and attendant advantages of the present invention will become apparent to those skilled in the art from a reading of the following detailed description of embodiments constructed in accordance therewith.

DETAILED DESCRIPTION OF EXEMPLARY EMBODIMENTS

One aspect of the present invention relates generally to a method for measuring a thickness of a coating of a constructional unit, in particular a heat-compatible coating on a component of a gas turbine, by three-dimensionally measuring coordinates of the constructional unit with a measuring device, in particular with an optical scanner, before and after the coating. At the same time, during the coating, a thermal distortion of the constructional unit is recorded. The thickness of the coating is subsequently determined from a comparison of the measured constructional unit coordinates before and after the coating, the thermal distortion of the constructional unit that is caused by the coating being taken into account in the thickness determination of the coating by a comparison with at least one reference point at an uncoated location.

An embodiment of a measuring method exemplifying principles of the present invention allows the thickness of the applied coating to be reliably determined without disturbing influences, such as a thermal distortion of the constructional unit for example, falsifying the measurement result. The thermal distortion, which can occur as a result of the introduction of heat during the coating, is compensated in the case of an exemplary method according to the invention by carrying out a comparison with at least one reference point at an uncoated location and being included in the calculation. In the case of a measuring device with an optical sensor, the measurement can be sped up by a 100% check of the applied coating being made possible, allowing a particularly high level of quality assurance to be achieved.

According to another exemplary embodiment of the solution according to the invention, the method is used for determining a mass-intensity distribution of a coating device. This involves coating a constructional unit in plate form without relative movement in relation to the coating device for a predefined time and carrying out three-dimensional measurement before and after the coating with a measuring device, in particular an optical scanner. By analogy with the measuring method for measuring the thickness of the coating, the thermal distortion of the constructional unit is in this case recorded during the coating and taken into account by measuring an uncoated rear side of the constructional unit. In general, the measuring can be performed here both manually with a measuring sensor and automatically with a 3D measuring device, for example a three-dimensional digitizing scanner. The mass-intensity profile of the sprayed spot that is obtained in this way can be used as an input for the offline programming of the coating device. A plasma-arc spray gun comes into consideration for example as the coating device. A method according to the invention, in particular by means of an optical scanner, allows the determination of the mass-density profile to be considerably sped up and made more precise.

According to yet another advantageous embodiment of the solution according to the invention, the mass-intensity distribution is determined from the thickness distribution. As mentioned above, the coatings are applied with coating devices, for example a plasma-arc spray gun, to the metallic components of the constructional unit in a number of layers, in that for each layer a number of strips of the layer material are sprayed onto the surface next to one another or else overlapping, until the surface is covered. If no relative movement between the constructional unit to be coated and the coating device takes place during the coating operation, the mass-intensity distribution of the coating device can be determined from the respective local layer thicknesses.

The coating is expediently applied by a plasma-arc spraying method. If energy is continuously supplied to a piece of material, its temperature increases and it is generally transformed via the liquid state into the gaseous state. If the supply of energy is continued, the kinetic energy of the elementary constituents increases with the temperature to a point at which the atomic shell including electrons is broken open in the collisions of the gas molecules and atoms, so that negatively charged electrons and positively charged ions are produced. This mixture, which on account of its high temperature has electrical conductivity and as a result can easily be influenced by external electric and magnetic fields, is known as plasma. Depending on the plasma gas that is used and the energy that is supplied, temperatures of up to 50 000

K are reached in the plasma jet. On account of the high energy content, such plasma methods make possible processes which cannot occur in other material states. Plasma-arc spraying methods are also distinguished by great flexibility and variety of processable materials, such as metals or ceramics for example, and have much higher application rates in comparison with vapor depositing methods. It is also important that plasma-sprayed coatings can be produced in a controlled constant or graduated manner, both with regard to the composition and with regard to the porosity. Since the plasma spraying method is a very rapid process, the supplied coating material interacts with the hot plasma only very briefly in order to be melted and applied to the surface that is to be coated. As a result, material changes can be largely suppressed or kept within tolerable limits.

According to another advantageous embodiment of the solution according to the invention, the coating is a metallic and/or ceramic coating. Ceramic layers have outstanding properties on constructional units made of steel. They are resistant to wear, have low friction and are electrically and thermally insulating. Given long machine running times, they contribute to lowering costs and ensure product quality by providing a surface that is stable over a long time.

In yet another embodiment in accordance with the present invention, the optical scanner produces a digital surface profile. Such a digital surface profile can be further processed by suitable software and used, for example, for the offline programming of the coating device. At the same time, the digital surface profile makes inclusion in other digital control operations possible, without manually determined measurement results previously having to be converted into digital form. The digital surface profile consequently speeds up the data determination and simplifies the transfer or further processing of the data.

According to a further embodiment, the measuring device for determining the constructional unit coordinates has a mechanical sensor. In comparison with an optical scanner, such mechanical sensors are much less costly and are well suited in particular for the determination of results from random sampling with a low number of samples. In addition, such a mechanical sensor is robust and flexible in its use. In particular for small series with low numbers of items and/or low quality requirements, which merely require temporary quality verification, the mechanical sensor is an inexpensive alternative to the optical scanner device.

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A method for measuring a thickness of a coating of a constructional unit, the method comprising:
   coating a constructional unit;
   measuring coordinates of the constructional unit three-dimensionally with a measuring device before and after the coating;
   recording a thermal distortion of the constructional unit during the coating;
   comparing the measured constructional unit coordinates before and after the coating;
   comparing the recorded thermal distortion of the constructional unit with at least one reference point on the constructional unit at an uncoated location;
   determining the thickness of the coating from at least said comparing the measured constructional unit coordinates before and after the coating and said comparing the thermal distortion.

2. The measuring method as claimed in claim 1, wherein:
   determining comprises determining a mass-intensity distribution of a coating device; and
   coating comprises coating a constructional unit in plate form without movement relative to a coating device for a predefined time.

3. The measuring method as claimed in claim 2, wherein the uncoated location comprises an uncoated rear side of the constructional unit.

4. The measuring method as claimed in claim 2, wherein determining the mass-intensity distribution comprises determining from the thickness distribution.

5. The measuring method as claimed in claim 2, further comprising:
   inputting the mass-intensity distribution of the coating device to offline programming.

6. The measuring method as claimed in claim 1, wherein coating comprises plasma-arc spraying.

7. The measuring method as claimed in claim 1, wherein coating comprises coating with a metallic material, a ceramic material, or both.

8. The measuring method as claimed in claim 1, wherein measuring comprises measuring with a mechanical sensor.

9. The method as claimed in claim 1, wherein coating comprises coating with a heat-compatible material on a component of a gas turbine.

10. The method as claimed in claim 1, wherein measuring comprises measuring with an optical scanner.

11. The measuring method as claimed in claim 10, further comprising:
    producing a digital surface profile with the optical scanner.

* * * * *